March 16, 1965

F. H. LAISHLEY 3,174,062

LOGICAL CIRCUITS

Filed Sept. 10, 1962

United States Patent Office 3,174,062

Patented Mar. 16, 1965

3,174,062

LOGICAL CIRCUITS

Frederick Herbert Laishley, Solihull, England, assignor to Joseph Lucas (Industries) Limited, Birmingham, England Filed Sept. 10, 1962, Ser. No. 222,381
Claims priority, application Great Britain, Sept. 18, 1961, 33,325/61
2 Claims. (Cl. 307—88.5)

This invention relates to solid state logical circuits and has for its object to provide such a circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property a convenient method of manufacturing a switchable rectifier being described in pending application No. 211,674 filed July 23, 1962.

A logical circuit in accordance with the invention comprises in combination a switchable rectifier, means for switching the switchable rectifier on when an input signal is received, and for switching the switchable rectifier off when the input signal is removed.

The input signal applied to the switchable rectifier may be one of two or more control signals where the circuit is to act as an AND gate, or may be a combination of two or more simultaneous control signals where the circuit is to act as an AND gate.

Figure 1:
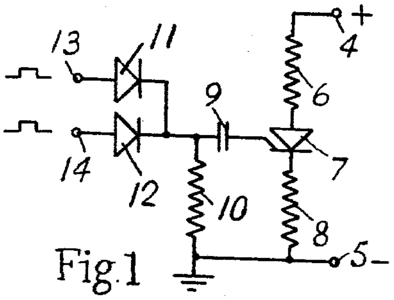
Figure 2:
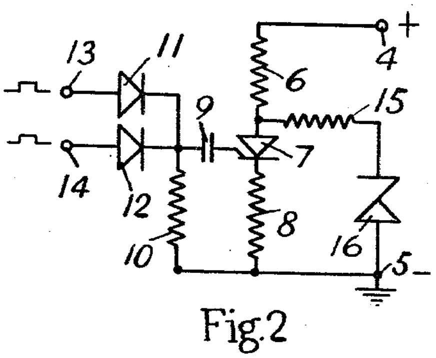

In the accompanying drawings, FIGURES 1 and 2 are circuit diagrams illustrating two examples of the invention respectively..

Referring to FIGURE 1 there are provided first and second supply terminals 4, 5 adapted for connection to a source of supply so as to be of relatively positive and negative polarity in use respectively. Conveniently, the terminal 5 is earthed.

The terminal 4 is connected through a resistor 6 to the anode of a switchable rectifier 7 the cathode of which is connected through a resistor 8 to the terminal 5. The gate of the switchable rectifier is connected to the terminal 5 through a capacitor 9 and a resistor 10 in series, and moreover a point intermediate the capacitor 9 and the resistor 10 is connected through a pair of diodes 11, 12 respectively to a pair of input terminals 13, 14.

The arrangement is such that when a positive control signal is received at either of the input terminals 13, 14 the capacitor 9 will be charged and the switchable rectifier 7 will receive an input signal and be switched on. The circuit components are so chosen that the voltage across the resistor 8 is less than that across the resistor 10, so that the switchable rectifier remains conductive until the input signal thereto is removed, at which point the voltage across the resistor 10 falls practically to zero, and the switchable rectifier 7 is switched off.

The above-described circuit acts as an OR gate, but where the circuit is to act as an AND gate the components are designed so that in order for the switchable rectifier to receive an input signal to switch it on, it is necessary for control signals to be received at both input terminals 13, 14 simultaneously.

The example shown in FIGURE 2 is similar to that shown in FIGURE 1 and like parts have been designated with similar reference numerals. In the example, the anode of the switchable rectifier 7 is connected to the terminal 5 through a resistor 15 and a Zener diode 16 in series, the output being taken from across the Zener diode. When the switchable rectifier 7 is non-conductive the Zener diode conducts and an output is received, but when the switchable rectifier conducts, the voltage across the Zener diode falls to practically zero and no output is produced. Either of the modifications described with reference to FIGURE 1 can be applied to this circuit.

It will be understood that although only two input terminals 13, 14 are shown, any number could be provided, the circuit being designed to operate when a control signal is received at one or all of the terminals.

Having thus described my invention what I claim as new and desire to secure by Letters Patent is:

1. A solid state logical circuit comprising in combination positive and negative supply terminals, a semiconductor switchable rectifier having an anode, a cathode and a gate, said switchable rectifier being switched on by positive current between its gate and cathode and being switched off by negative current between its gate and cathode, first and second resistors connecting the anode and cathode of said switchable rectifier to said positive and negative terminals respectively, a capacitor and a third resistor connected in series between the gate of said switchable rectifier and said negative terminal, and a plurality of input terminals connected through the anodes and cathodes of a plurality of diodes respectively to a point intermediate said capacitor and said third resistor, the resistance of said third resistor being such that said switchable rectifier is rendered conductive only when a positive control signal is applied to the gate of said switchable rectifier by way of at least one of said diodes and said capacitor, said switchable rectifier being switched off on removal of said control signal by discharge of said capacitor through the gate and cathode of said switchable rectifier.

2. A solid state logical circuit comprising in combination positive and negative supply terminals, a semiocnductor switchable rectifier having an anode, a cathode and a gate, said switchable rectifier being switched on by positive current flowing between its gate and cathode and being switched off by negative current flowing between its gate and cathode, first and second resistors connecting the anode and cathode of said switchable rectifier to said positive and negative terminals respectively, a capacitor and a third resistor connected in series between the gate of said switchable rectifier and said negative terminal, a fourth resistor and a Zener diode connected in series between the anode of said switchable rectifier and said negative terminal, and a plurality of input terminals connected through the anodes and cathodes of a plurality of diodes respectively to a point intermediate its said capacitor and said third resistor, the resistance of said third resistor being such that said switchable rectifier is rendered conductive only when a positive control signal is applied between its gate and cathode by way of at least one of said diodes and said capacitor, said switchable rectifier being switched off by discharge of said capacitor when said control signal is removed.

References Cited by the Examiner

UNITED STATES PATENTS 2,963,698 12/60 Slocomb ------------- 307—88.5

FOREIGN PATENTS 442,747 2/36 Great Britain.

OTHER REFERENCES

Solid State Products Inc., Bulletin D420-402, Dec. 1959, pages 19 and 20.

ARTHUR GAUSS, *Primary Examiner.*